US012794342B2

(12) United States Patent
Mitsugi

(10) Patent No.: US 12,794,342 B2
(45) Date of Patent: Nov. 10, 2026

(54) POWER STORAGE SYSTEM AND CONTROL DEVICE

(71) Applicant: TMEIC Corporation, Tokyo (JP)

(72) Inventor: Yasuaki Mitsugi, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 217 days.

(21) Appl. No.: 18/850,736

(22) PCT Filed: Jan. 18, 2023

(86) PCT No.: PCT/JP2023/001304

§ 371 (c)(1),
(2) Date: Sep. 25, 2024

(87) PCT Pub. No.: WO2024/154244

PCT Pub. Date: Jul. 25, 2024

(65) Prior Publication Data

US 2025/0211088 A1 Jun. 26, 2025

(51) Int. Cl.
*H02M 1/00* (2007.01)
*H02J 7/00* (2026.01)
(Continued)

(52) U.S. Cl.
CPC ............. *H02M 1/0048* (2021.05); *H02J 7/40* (2026.01); *H02J 7/50* (2026.01); *H02J 7/855* (2026.01);
(Continued)

(58) Field of Classification Search
None
See application file for complete search history.

(56) References Cited

U.S. PATENT DOCUMENTS 6,741,065 B1 5/2004 Ishii et al.
9,627,907 B2 4/2017 Ohashi et al.
(Continued)

FOREIGN PATENT DOCUMENTS

JP 3890168 B2 3/2007
JP 5924524 B2 5/2016
(Continued)

OTHER PUBLICATIONS

Office Action issued on May 2, 2025, in corresponding Japanese patent Application No. 2024-571491, 12 pages.
(Continued)

*Primary Examiner* — David Earl Ogg
(74) *Attorney, Agent, or Firm* — XSENSUS LLP

(57) ABSTRACT

A plurality of power conversion devices convert direct current power to load based on direct current power stored in a plurality of power storage devices. The plurality of power conversion devices convert power of the load into direct current power corresponding to the plurality of power storage devices. The plurality of power conversion devices charge the plurality of power storage devices based on the power of the load side. The control device includes a conversion device determination part determining the power conversion devices among the plurality of power conversion devices to which an operation command is to be transmitted. The conversion device determination part is configured to determine, based on the information related to the states of the plurality of power storage devices and the plurality of power conversion devices, a number of the power conversion devices to which the operation command is to be transmitted.

11 Claims, 3 Drawing Sheets

(51) Int. Cl.

| | |
|---|---|
| ***H02J 7/40*** | (2026.01) |
| ***H02J 7/50*** | (2026.01) |
| ***H02J 7/90*** | (2026.01) |

(52) U.S. Cl.

CPC ........... *H02J 7/933* (2026.01); *H02M 1/0003* (2021.05); *H02J 2207/20* (2020.01)

(56) References Cited

U.S. PATENT DOCUMENTS

| | | | | |
|---|---|---|---|---|
| 2014/0077596 | A1* | 3/2014 | Nishibayashi ...... | H02J 13/1321 307/29 |
| 2020/0212682 | A1* | 7/2020 | Mitsugi ..................... | H02J 3/16 |
| 2020/0274357 | A1 | 8/2020 | Inoue et al. | |
| 2022/0037900 | A1 | 2/2022 | Hira | |
| 2023/0051658 | A1 | 2/2023 | Moriyama et al. | |
| 2023/0187941 | A1 | 6/2023 | Mitsugi | |

FOREIGN PATENT DOCUMENTS

| | | | | |
|---|---|---|---|---|
| JP | 2019-118209 | A | | 7/2019 |
| JP | 2021058034 | A | * | 4/2021 |
| JP | 2021-129430 | A | | 9/2021 |
| JP | 2022-061069 | A | | 4/2022 |
| WO | 2020/217339 | A1 | | 10/2020 |
| WO | 2022/176052 | A1 | | 8/2022 |

OTHER PUBLICATIONS

International Search Report mailed on Apr. 4, 2023, received for International Application No. PCT/JP2023/001304, filed on Jan. 18, 2023, 05 pages including English Translation.

Written Opinion mailed on Apr. 4, 2023, received for International Application No. PCT/JP2023/001304, filed on Jan. 18, 2023, 07 pages including Machine Translation.

Extended European Search Report mailed Sep. 30, 2026 in corresponding European patent application No. 23917458.4 (9 pages).

* cited by examiner

POWER STORAGE SYSTEM AND CONTROL DEVICE

CROSS-REFERENCE TO RELATED APPLICATION

This application is a national stage application, pursuant to 35 U.S.C. § 371, of International Patent Application No. PCT/JP2023/001304, filed Jan. 18, 2023, the entire contents of which are incorporated herein by reference.

FIELD

Embodiments described herein relate generally to a power storage system and a control device.

BACKGROUND ART

A known power storage system includes multiple power storage devices, multiple power conversion devices, and a control device. The multiple power conversion devices are provided to correspond respectively to the multiple power storage devices. The power conversion devices are connected to the power storage devices and are connected to a common load. The power conversion devices supply power to the load based on the power stored in the power storage devices, and charge the storage devices based on the power of the load side. The control device controls the power conversion operation of the multiple power conversion devices.

For example, such a power storage system is used to suppress fluctuation of the frequency of a power system. The power conversion devices are connected to the power system with the power system side as the voltage source, and suppress the frequency fluctuation of the power system by supplying power to the power system and charging the power storage devices with the power of the power system. Or, the power storage system is used in an electric vehicle such as an electric locomotive, an electric car, etc. The power conversion devices are connected to the motor of the electric vehicle with the motor as the load, supply power to the motor, and charge the power storage devices with the regenerative energy of the motor.

The control device determines the output of each of the multiple power conversion devices based on the power necessary for the load, and operates each of the multiple power conversion devices based on the determined output. However, in a control method in which all of the multiple power conversion devices are operated regardless of the magnitude of the power necessary for the load, the power loss accompanying the operation of the multiple power conversion devices is undesirably increased. It is therefore desirable to be capable of suppressing the power loss in the power storage system and the control device used in the power storage system.

CITATION LIST

Patent Literature

[Patent Literature 1]
Japanese Patent No. 3890168
[Patent Literature 2]
Japanese Patent No. 5924524

SUMMARY OF INVENTION

Problem to be Solved by the Invention

Embodiments of the invention provide a power storage system and a control device in which the power loss can be suppressed.

Solution to Problem

According to an embodiment of the invention, a power storage system is provided. The power storage system includes a plurality of power storage devices capable of discharging and charging direct current power; a plurality of power conversion devices connected to the plurality of power storage devices and a load, the plurality of power conversion devices converting direct current power stored in the plurality of power storage devices into power corresponding to the load, the plurality of power conversion devices supplying the power to the load based on the direct current power stored in the plurality of power storage devices, the plurality of power conversion devices converting power of the load into direct current power corresponding to the plurality of power storage devices, the plurality of power conversion devices charging the plurality of power storage devices based on the power of the load side; and a control device controlling a power conversion operation of the plurality of power conversion devices. The control device includes an output value determination part determining a total value of active power and a total value of reactive power output from the plurality of power conversion devices, a conversion device determination part determining the power conversion devices among the plurality of power conversion devices to which an operation command is to be transmitted, and a command transmitting part transmitting the operation command to the power conversion devices determined by the conversion device determination part and transmitting a standby command to remaining power conversion devices among the plurality of power conversion devices to which the operation command is not to be transmitted. The conversion device determination part includes a priority list representing priorities of the plurality of power conversion devices. The priority list includes a plurality of data sets corresponding respectively to the plurality of power conversion devices. The plurality of data sets associate and store the priorities of the plurality of power conversion devices, identification information for identifying the plurality of power conversion devices, and information related to states of the plurality of power storage devices and the plurality of power conversion devices. The conversion device determination part is configured to determine, based on the total value of the active power and the total value of the reactive power determined by the output value determination part and based on the information related to the states of the plurality of data sets, a number of the power conversion devices to which the operation command is to be transmitted. The conversion device determination part is configured to determine, as the power conversion devices to which the operation command is to be transmitted, the determined number of the power conversion devices among the plurality of power conversion devices in descending order of the priorities of the priority list.

Advantageous Effects of Invention

According to embodiments of the invention, a power storage system and a control device in which the power loss can be suppressed are provided.

DESCRIPTION OF EMBODIMENTS

Figure 1:
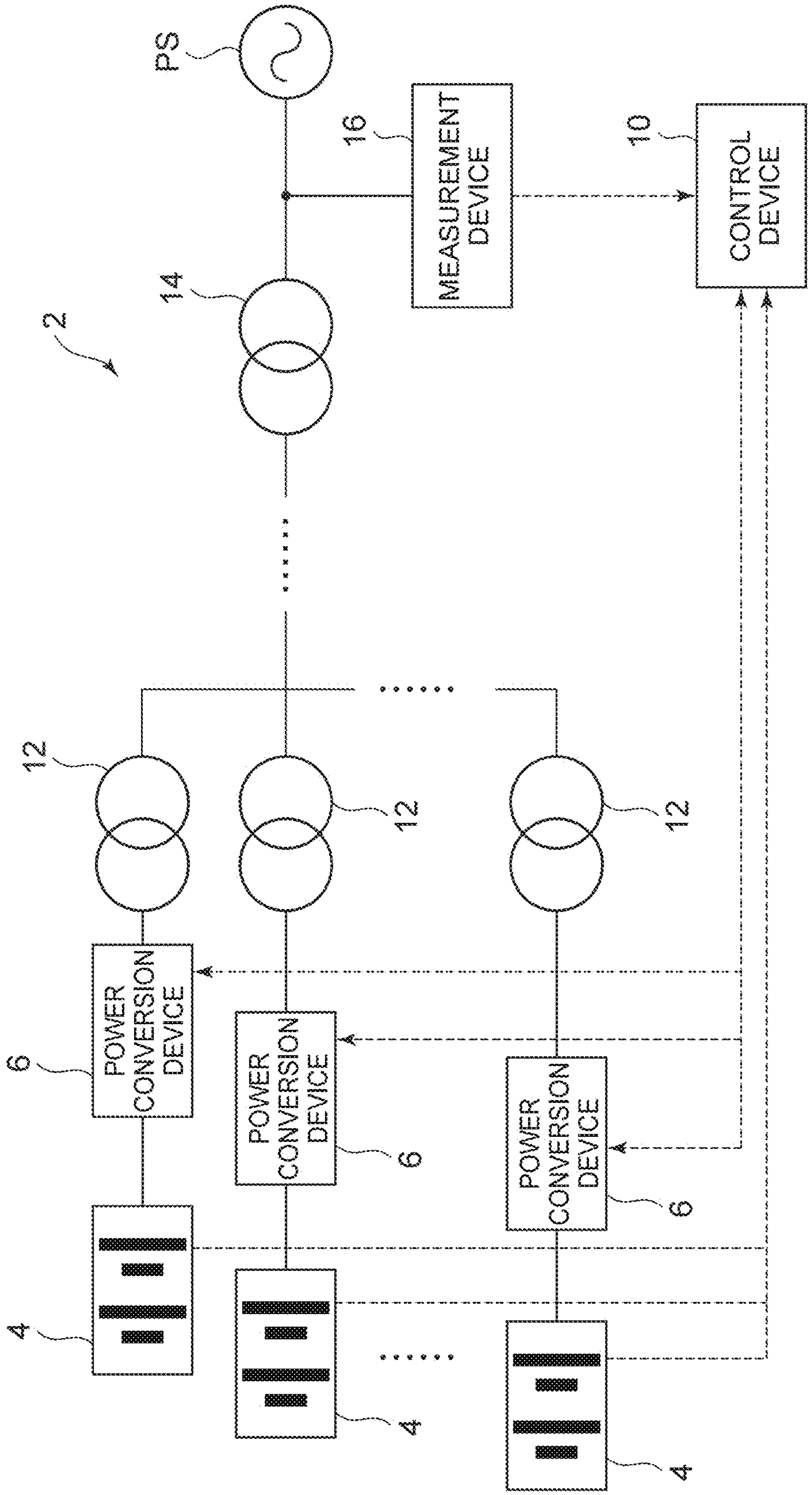
FIG. 1 is a block diagram schematically illustrating a power storage system according to an embodiment.

Embodiments will now be described with reference to the drawings.

The drawings are schematic and conceptual; and the relationships between the thicknesses and widths of portions, the proportions of sizes among portions, etc., are not necessarily the same as the actual values. Also, the dimensions and proportions may be illustrated differently among drawings, even for identical portions.

In the specification and drawings, components similar to those described previously or illustrated in an antecedent drawing are marked with the same reference numerals; and a detailed description is omitted as appropriate.

FIG. 1 is a block diagram schematically illustrating a power storage system according to an embodiment.

As illustrated in FIG. 1, the power storage system 2 includes multiple power storage devices 4, multiple power conversion devices 6, and a control device 10. The multiple power storage devices 4 can store DC power, can supply (discharge) the stored DC power, and can re-store (be charged with) DC power according to an inflow of DC power that is greater than the stored DC power. The multiple power storage devices 4 are, for example, devices that use storage batteries. The multiple power storage devices 4 may be, for example, devices that use capacitors, etc. The multiple power storage devices 4 may be any device that can discharge and charge DC power.

The multiple power conversion devices 6 are provided to correspond respectively to the multiple power storage devices 4. The number of the multiple power conversion devices 6 is, for example, equal to the number of the multiple power storage devices 4. The multiple power conversion devices 6 are connected respectively to the multiple power storage devices 4. However, multiple power storage devices 4 may be connected to one power conversion device 6. The number of the multiple power conversion devices 6 may not always be equal to the number of the multiple power storage devices 4.

The power storage system 2 further includes, for example, multiple transformers 12 and a transformer 14. The multiple transformers 12 are provided to correspond respectively to the multiple power conversion devices 6. The multiple power conversion devices 6 are connected to the multiple transformers 12. The multiple transformers 12 are connected to the transformer 14. The transformer 14 is connected to a power system PS. The multiple power conversion devices 6 are connected with the power system PS that is the load via the transformers 12 and 14, etc. A circuit-breaker, more transformers, etc., may be located between the power system PS and the power conversion devices 6. The configuration between the power system PS and the power conversion devices 6 may be any configuration that can connect the power conversion devices 6 to the power system PS.

The power of the power system PS (the load) is AC power. The power of the power system PS is, for example, three-phase AC power. However, the power of the power system PS (the load) is not limited to AC power and may be DC power, etc.

The multiple power conversion devices 6 convert the DC power stored in the multiple power storage devices 4 into power corresponding to the power system PS and convert the power of the power system PS into DC power corresponding to the multiple power storage devices 4. The multiple power conversion devices 6 include, for example, multiple switching elements and convert the power by switching the multiple switching elements. However, the configuration of the multiple power conversion devices 6 may be any configuration that can convert in the two directions of the conversion in the discharge direction of the multiple power storage devices 4 and the conversion in the charge direction of the multiple power storage devices 4.

The multiple power conversion devices 6 supply the power to the power system PS based on the DC power stored in the multiple power storage devices 4 and charge the multiple power storage devices 4 based on the power of the power system PS side. As a result, for example, the power storage system 2 suppresses the frequency fluctuation of the power system PS.

The power storage system 2 further includes, for example, a measurement device 16. For example, the measurement device 16 detects the active power value, the reactive power value, and the voltage value of the connection point between the power system PS and the multiple power conversion devices 6 and inputs the active power value, the reactive power value, and the voltage value that are detected to the control device 10.

The control device 10 controls the power conversion operation of the multiple power conversion devices 6. For example, the control device 10 communicates with the measurement device 16 and acquires information of the active power value, the reactive power value, and the voltage value of the connection point from the measurement device 16. Also, for example, the control device 10 acquires information related to the states of the multiple power storage devices 4 and the multiple power conversion devices 6 by communicating with the multiple power storage devices 4 and the multiple power conversion devices 6. The control device 10 controls the operations of the multiple power conversion devices 6 based on the acquired information. For example, the control device 10 suppresses the frequency fluctuation of the power system PS by controlling the operations of the multiple power conversion devices 6 based on the acquired information.

For example, the control device 10 communicates with the multiple power storage devices 4 to acquire, from the multiple power storage devices 4, information of the charge amounts of the power storage devices 4, information of the dischargeable amounts, and information of the chargeable amounts as information related to the state. More specifically, the control device 10 communicates with BMUs (Battery Management Units) of the multiple power storage devices 4 to acquire the information of the charge amounts, the information of the dischargeable amounts, and the information of the chargeable amounts from the BMUs of the power storage devices 4.

Also, for example, the control device 10 communicates with the multiple power conversion devices 6 to acquire, from the multiple power conversion devices 6, information of the capacitive reactive power outputtable amounts, information of the inductive reactive power outputtable amounts, and information of the operating statuses of the power conversion devices 6 as information related to the states.

In other words, the capacitive reactive power outputtable amounts of the power conversion devices 6 are the output upper limits of the reactive power of the power conversion devices 6. In other words, the capacitive reactive power outputtable amounts of the power conversion devices 6 are the reactive power magnitudes outputtable from the power conversion devices 6 that are in a direction causing the voltage of the connection point to increase. In other words, the inductive reactive power outputtable amounts of the power conversion devices 6 are the output lower limits of the reactive power of the power conversion devices 6. In other words, the inductive reactive power outputtable amounts of the power conversion devices 6 are the reactive power magnitudes outputtable from the power conversion devices 6 in a direction causing the voltage of the connection point to decrease.

In other words, the capacitive reactive power is leading reactive power when viewed from the power system PS side (lagging reactive power when viewed from the power conversion device 6 side). In other words, the inductive reactive power is lagging reactive power when viewed from the power system PS side (leading reactive power when viewed from the power conversion device 6 side).

The information of the operating statuses is information that indicates which states among the operating state, the standby state, and the stopped state that the power conversion devices 6 respectively are in. The operating state is a state in which the power conversion device 6 is performing the power conversion operation. In other words, the operating state is a state in which the power conversion device 6 charges or discharges the power storage device 4.

The standby state is a state in which the power conversion device 6 has stopped the power conversion operation based on a control of the control device 10. For example, when the power conversion device 6 includes multiple switching elements and is configured to perform the power conversion operation based on gate signals (control signals) from the control device 10, the standby state is a gate blocking state in which the input of the gate signals from the control device 10 to the power conversion device 6 is stopped. In other words, the standby state is a rest state in which the power conversion device 6 pauses the power conversion operation based on the control of the control device 10.

The stopped state is a state in which the power conversion device 6 cannot perform the power conversion operation due to failure of a device, etc. In other words, the stopped state is a failure state.

The control device 10 controls the operations of the multiple power conversion devices 6 based on information such as that described above. However, the information that is acquired by the control device 10 is not limited to the information described above, and may be any information necessary for controlling the multiple power conversion devices 6. The information that is included in the information related to the states of the multiple power storage devices 4 and the multiple power conversion devices 6 is not limited to the information described above, and may be any information necessary for controlling the multiple power conversion devices 6.

Figure 2:
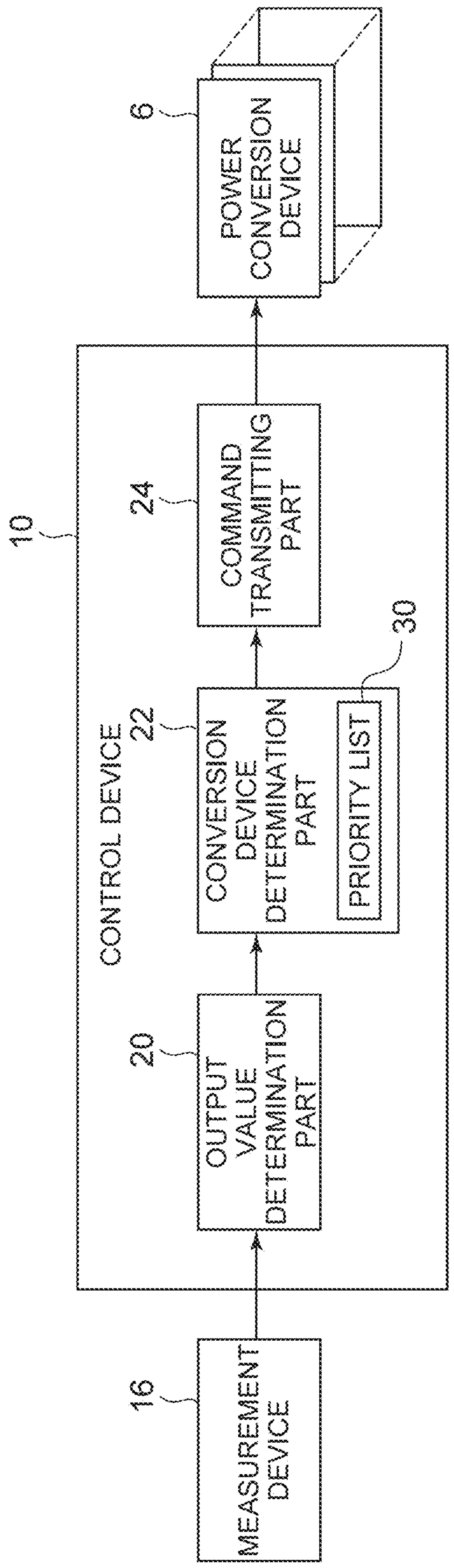
FIG. 2 is a block diagram schematically illustrating the control device according to the embodiment.

FIG. 2 is a block diagram schematically illustrating the control device according to the embodiment.

As illustrated in FIG. 2, the control device 10 includes an output value determination part 20, a conversion device determination part 22, and a command transmitting part 24.

The output value determination part 20 determines the total value of the active power and the total value of the reactive power output from the multiple power conversion devices 6. For example, based on the active power value, the reactive power value, and the voltage value of the connection point input from the measurement device 16, the output value determination part 20 determines the total value of the active power and the total value of the reactive power output from the multiple power conversion devices 6 by calculating the active power and the reactive power necessary to suppress the frequency fluctuation of the power system PS.

However, the method for determining the total value of the active power and the total value of the reactive power is not limited to that described above. For example, the output value determination part 20 may determine the total value of the active power and the total value of the reactive power based on a command value input from a higher-level controller, etc. The method for determining the total value of the active power and the total value of the reactive power may be any method adapted to the system configuration of the power storage system 2, etc.

The conversion device determination part 22 determines the power conversion devices 6 among the multiple power conversion devices 6 to which the operation command is to be transmitted. The conversion device determination part 22 includes a priority list 30 that represents the priorities of the multiple power conversion devices 6. The conversion device determination part 22 determines the power conversion devices 6 among the multiple power conversion devices 6 to which the operation command is to be transmitted based on the priority list 30 and the total value of the active power and the total value of the reactive power determined by the output value determination part 20.

After determining the power conversion devices 6 to which the operation command is to be transmitted, the conversion device determination part 22 inputs the information of the determined power conversion devices 6 to the command transmitting part 24.

Based on the information input from the conversion device determination part 22, the command transmitting part 24 transmits the operation command to the power conversion devices 6 determined by the conversion device determination part 22. For example, the command transmitting part 24 divides the total value of the active power and the total value of the reactive power determined by the output value determination part 20 by the number determined by the conversion device determination part 22 to determine the active power and the reactive power per power conversion device 6, and transmits the operation command to the determined power conversion devices 6 to output the determined active power and reactive power.

Also, the command transmitting part 24 transmits a standby command to the remaining power conversion devices 6 among the multiple power conversion devices 6 to which the operation command is not to be transmitted. The standby command is a command that stops the operation of the power conversion device 6. In other words, the standby command is a command that sets the power conversion device 6 to the standby state. The standby command is, for example, a command that switches the multiple switching elements of the power conversion device 6 to the off-state. The standby command also may be called a gate block command, etc.

Also, for example, when circuit-breakers and the like are located between the power conversion devices 6 and the power storage devices 4 and between the power conversion devices 6 and the transformers 12 (at the branch point of the multiple power conversion devices 6), the circuit-breakers that correspond to the power conversion devices 6 to which the standby command is to be transmitted are left in the on-state when the command transmitting part 24 transmits the standby command. In other words, when the command transmitting part 24 transmits the standby command, the power conversion devices 6 are left in the state of being connected to the power storage devices 4 and the power system PS; and only the operations of the power conversion devices 6 are stopped by the transmission of the standby command. The standby command is, for example, a command that stops the operation of the power conversion device 6 while allowing the power conversion device 6 to be operated immediately.

For example, the control device 10 operates every prescribed control period such as 100 ms, etc. For example, for each control period, the control device 10 acquires the information, causes the output value determination part 20 to determine the total value of the active power and the total value of the reactive power to be output from the multiple power conversion devices 6, causes the conversion device determination part 22 to determine the power conversion devices 6 to which the operation command is to be transmitted, and transmits the operation command or the standby command from the command transmitting part 24 to the multiple power conversion devices 6. As a result, the control device 10 controls the operations of the multiple power conversion devices 6 every prescribed control period.

Figure 3:
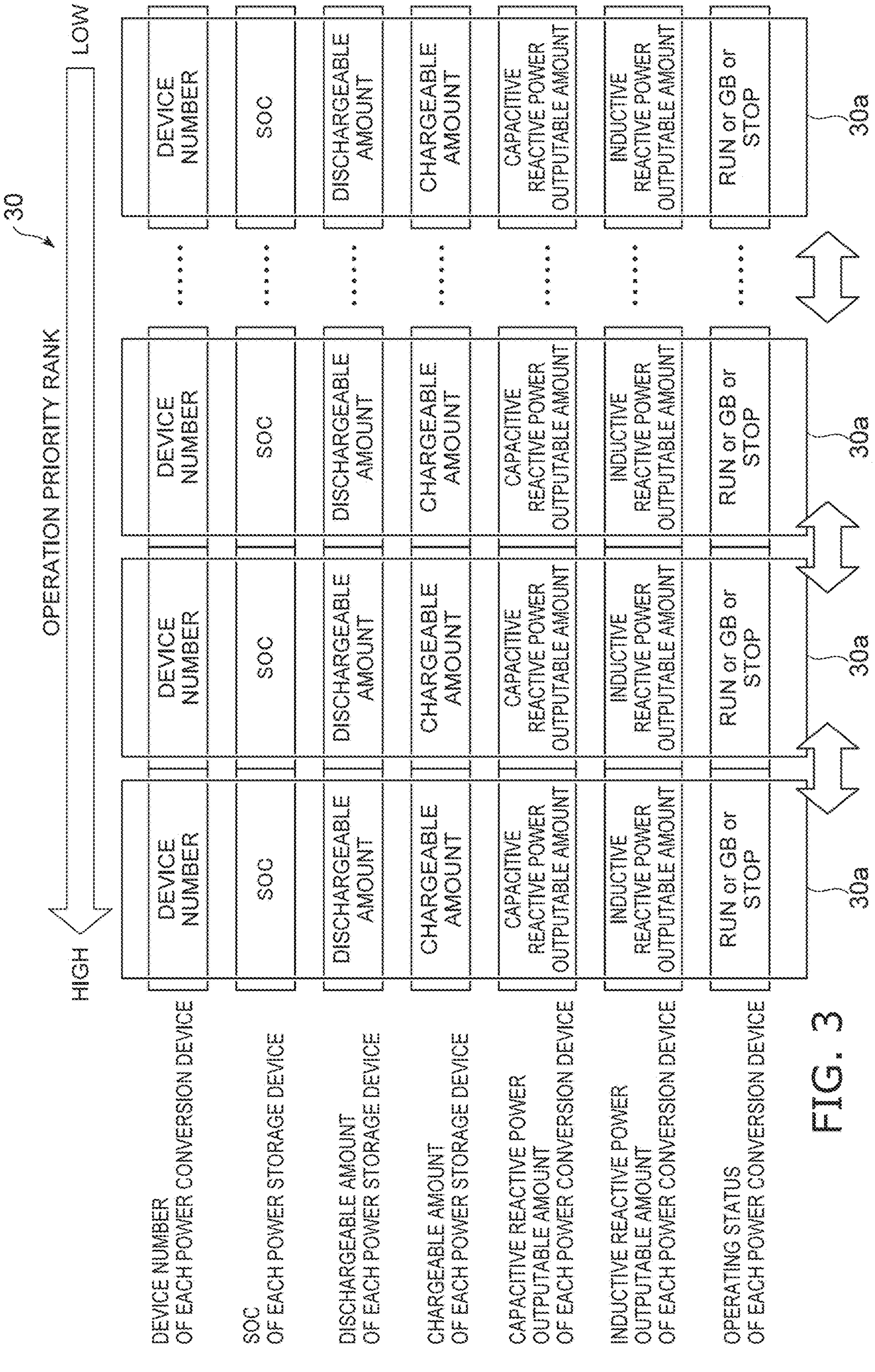
FIG. 3 is an explanatory drawing schematically illustrating an example of the priority list.

FIG. 3 is an explanatory drawing schematically illustrating an example of the priority list.

As illustrated in FIG. 3, the priority list 30 includes multiple data sets 30*a* corresponding respectively to the multiple power conversion devices 6. The multiple data sets 30*a* associate and store the priorities of the multiple power conversion devices 6, the identification information for identifying the multiple power conversion devices 6, and the information related to the states of the multiple power storage devices 4 and the multiple power conversion devices 6. The priority list 30 is, for example, table data that associates and stores such information.

The priority indicates the priority rank of transmitting the operation command to the power conversion device 6 indicated by the identification information. The identification information is, for example, unique device numbers assigned respectively to the multiple power conversion devices 6 to identify the multiple power conversion devices 6. However, the identification information is not limited thereto, and may be any information that can identify the multiple power conversion devices 6.

The information related to the states of the multiple power storage devices 4 and the multiple power conversion devices 6 includes, for example, information of the charge amounts (SOCs: State Of Charges), information of the dischargeable amounts, information of the chargeable amounts, information of the capacitive reactive power outputtable amounts, information of the inductive reactive power outputtable amounts, and information of the operating statuses.

The information of the charge amount indicates the charge amount of the power storage device 4 connected to the power conversion device 6 indicated by the identification information. The information of the dischargeable amount indicates the dischargeable amount of the power storage device 4 connected to the power conversion device 6 indicated by the identification information. The information of the chargeable amount indicates the chargeable amount of the power storage device 4 connected to the power conversion device 6 indicated by the identification information. The information of the capacitive reactive power outputtable amount indicates the outputtable amount of the capacitive reactive power of the power conversion device 6 indicated by the identification information. The information of the inductive reactive power outputtable amount indicates the outputtable amount of the inductive reactive power of the power conversion device 6 indicated by the identification information.

The information of the operating status indicates the operating status of the power conversion device 6 indicated by the identification information. In other words, the operating status indicates a state among the operating state, the standby state, and the stopped state that the power conversion device 6 indicated by the identification information is in. For convenience in FIG. 3, the operating state is shown as "RUN", the standby state is shown as "GB", and the stopped state is shown as "STOP".

Thus, the priority list 30 is, for example, table data in which the multiple data sets 30*a* corresponding respectively to the multiple power conversion devices 6 are arranged in an order corresponding to the priorities. However, the information included in the data set 30*a* is not limited to that described above. The data set 30*a* may further include, for example, other information.

The conversion device determination part 22 determines the priorities of the multiple power conversion devices 6 of the priority list 30 according to the charge amounts of the multiple power storage devices 4. In such a case, the conversion device determination part 22 changes the priorities of the multiple power conversion devices 6 according to the output direction of the active power of the multiple power conversion devices 6.

When the output direction of the active power of the multiple power conversion devices 6 is the discharge direction of supplying the power to the power system PS, the conversion device determination part 22 increases the priorities of the power conversion devices 6 having high charge amounts of the power storage devices 4. Then, when the output direction of the active power of the multiple power conversion devices 6 is the charge direction of charging the power storage devices 4 based on the power of the power system PS, the conversion device determination part 22 increases the priorities of the power conversion devices 6 having low charge amounts of the power storage devices 4. The decrease of the charge amounts and/or the overcharge of the multiple power storage devices 4 can be suppressed thereby.

The control device 10 acquires the information related to the states of the multiple power storage devices 4 and the multiple power conversion devices 6 regularly (e.g., each control period) and inputs the acquired information to the conversion device determination part 22. In other words, the conversion device determination part 22 regularly acquires the information related to the states. For example, the conversion device determination part 22 regularly communicates with the multiple power storage devices 4 and the multiple power conversion devices 6 to regularly acquire the information of the charge amounts of the power storage devices 4, the information of the dischargeable amounts, the information of the chargeable amounts, the information of the capacitive reactive power outputtable amounts of the power conversion devices 6, the information of the inductive reactive power outputtable amounts, and the information of the operating statuses. The information that is acquired is associated with the identification information. As a result, the conversion device determination part 22 can recognize the information corresponding to the multiple power conversion devices 6.

After acquiring the information related to the states, the conversion device determination part 22 updates the information related to the states in the multiple data sets 30*a* of the priority list 30 based on the acquired information related to the states. As a result, the values of the items of the information related to the states in the multiple data sets 30*a* are updated to the current values of the power storage devices 4 and the power conversion devices 6.

When determining the power conversion devices 6 to which the operation command is to be transmitted, the conversion device determination part 22 determines whether the output direction of the active power of the multiple power conversion devices 6 is the direction of discharging from the multiple power storage devices 4 or the direction of charging the multiple power storage devices 4 based on the total value of the active power output from the multiple power conversion devices 6 determined by the output value determination part 20. For example, when the discharge direction is positive and the charge direction is negative, the conversion device determination part 22 determines the discharge direction or the charge direction based on the sign of the total value of the active power output from the multiple power conversion devices 6.

Also, when determining the power conversion devices 6 to which the operation command is to be transmitted, the conversion device determination part 22 determines the discharge direction or the charge direction based on the sign of the total value of the active power, and determines whether the reactive power output from the multiple power conversion devices 6 is capacitive reactive power or inductive reactive power based on the total value of the reactive power output from the multiple power conversion devices 6 determined by the output value determination part 20.

After the determination described above, the conversion device determination part 22 determines the number of the power conversion devices 6 to which the operation command is to be transmitted based on the priority list 30.

When the output direction of the active power of the multiple power conversion devices 6 is determined to be the discharge direction, the conversion device determination part 22 performs a calculation of adding the dischargeable amounts in order from the power conversion devices 6 having high priorities in the priority list 30. In such a case, the conversion device determination part 22 determines the number at which the value (the absolute value) of the added dischargeable amounts reaches or exceeds the total value (the absolute value) of the active power determined by the output value determination part 20 as the number of the power conversion devices 6 necessary for active power.

For example, when the absolute value of the added dischargeable amounts reaches or exceeds the absolute value of the total value of the active power when the dischargeable amounts of five power conversion devices 6 are added in order from the high priority side, the conversion device determination part 22 determines the number of the power conversion devices 6 necessary for active power to be five.

Also, at this time, the conversion device determination part 22 excludes the power conversion devices 6 in the stopped state from the calculation of adding the dischargeable amounts based on the information of the operating statuses of the power conversion devices 6 included in the data sets 30*a* of the priority list 30. For example, when the operating status of the power conversion device 6 having the second highest priority is in the stopped state, the conversion device determination part 22 excludes the second power conversion device 6 from the calculation, and adds the dischargeable amount of the power conversion device 6 having the first priority and the dischargeable amount of the power conversion device 6 having the third priority.

On the other hand, when the output direction of the active power of the multiple power conversion devices 6 is determined to be the charge direction, the conversion device determination part 22 performs a calculation of adding the chargeable amounts in order from the power conversion devices 6 having high priorities in the priority list 30. In such a case, the conversion device determination part 22 determines the number at which the value (the absolute value) of the added chargeable amounts reaches or exceeds the total value (the absolute value) of the active power determined by the output value determination part 20 as the number of the power conversion devices 6 necessary for active power. At this time, the conversion device determination part 22 excludes the power conversion devices 6 in the stopped state from the calculation of adding the chargeable amounts based on the information of the operating statuses of the power conversion devices 6 included in the data sets 30*a* of the priority list 30.

When the reactive power that is output from the multiple power conversion devices 6 is determined to be capacitive reactive power, the conversion device determination part 22 performs a calculation of adding the capacitive reactive power outputtable amounts in order from the power conversion devices 6 having high priorities in the priority list 30. In such a case, the conversion device determination part 22 determines the number at which the value (the absolute value) of the added capacitive reactive power outputtable amounts reaches or exceeds the total value (the absolute value) of the reactive power determined by the output value determination part 20 as the number of the power conversion devices 6 necessary for reactive power. At this time, the conversion device determination part 22 excludes the power conversion devices 6 in the stopped state from the calculation of adding the capacitive reactive power based on the information of the operating statuses of the power conversion devices 6 included in the data sets 30*a* of the priority list 30.

On the other hand, when the reactive power that is output from the multiple power conversion devices 6 is determined to be inductive reactive power, the conversion device determination part 22 performs a calculation of adding the inductive reactive power outputtable amounts in order from the power conversion devices 6 having high priorities in the priority list 30. In such a case, the conversion device determination part 22 determines the number at which the value (the absolute value) of the added inductive reactive power outputtable amounts reaches or exceeds the total value (the absolute value) of the reactive power determined by the output value determination part 20 as the number of the power conversion devices 6 necessary for reactive power. At this time, the conversion device determination part 22 excludes the power conversion devices 6 in the stopped state from the calculation of adding the inductive reactive power based on the information of the operating statuses of the power conversion devices 6 included in the data sets 30*a* of the priority list 30.

After determining the number of the power conversion devices 6 necessary for active power and the number of the power conversion devices 6 necessary for reactive power, the conversion device determination part 22 compares the number of the power conversion devices 6 necessary for active power and the number of the power conversion devices 6 necessary for reactive power and determines the greater number as the number of the power conversion devices 6 to which the operation command is to be transmitted.

After determining the number of the power conversion devices 6 to which the operation command is to be transmitted, the conversion device determination part 22 determines the determined number of power conversion devices 6 among the multiple power conversion devices 6 in descending order of the priorities of the priority list 30 as the power conversion devices 6 to which the operation command is to be transmitted. However, the conversion device determination part 22 excludes the power conversion devices 6 in the stopped state from the power conversion devices 6 to which the operation command is to be transmitted based on the information of the operating statuses of the power conversion devices 6 included in the data sets 30*a* of the priority list 30.

For example, when the conversion device determination part 22 determines the number of the power conversion devices 6 to which the operation command is to be transmitted to be five, the power conversion devices 6 having the five highest priorities in the priority list 30 are determined as the power conversion devices 6 to which the operation command is to be transmitted. At this time, when the operating status of the power conversion device 6 having the fifth priority is in the stopped state, the conversion device determination part 22 excludes the power conversion device 6 having the fifth priority from the power conversion devices 6 to which the operation command is to be transmitted, and adds the power conversion device 6 having the sixth priority to the power conversion devices 6 to which the operation command is to be transmitted.

As described above, after determining the power conversion devices 6 to which the operation command is to be transmitted, the conversion device determination part 22 inputs the information of the determined power conversion devices 6 to the command transmitting part 24. For example, the conversion device determination part 22 can identify the power conversion devices 6 to which the operation command is to be transmitted by the command transmitting part 24 by inputting the identification information of the determined power conversion devices 6 to the command transmitting part 24.

The charge amounts of the multiple power storage devices 4 change according to the operations of the multiple power conversion devices 6. Therefore, the conversion device determination part 22 regularly updates the priorities of the multiple power conversion devices 6. For example, the conversion device determination part 22 updates the priorities of the multiple power conversion devices 6 each time the information necessary for the control is regularly acquired. In other words, the conversion device determination part 22 updates the priorities of the multiple power conversion devices 6 each control period of the control device 10. However, the period of updating the priorities may not always be equal to the control period.

When updating the priorities, first, the conversion device determination part 22 determines whether the output direction of the active power of the multiple power conversion devices 6 is the direction of discharging from the multiple power storage devices 4 or the direction of charging the multiple power storage devices 4 based on the total value of the active power output from the multiple power conversion devices 6 determined by the output value determination part 20.

When the output direction of the active power is determined to be the discharge direction, the conversion device determination part 22 increases the priorities of the power conversion devices 6 having high charge amounts of the power storage devices 4. Also, when the output direction of the active power is determined to be the charge direction, the conversion device determination part 22 increases the priorities of the power conversion devices 6 having low charge amounts of the power storage devices 4.

After determining the output direction of the active power, the conversion device determination part 22 performs sort processing of the data sets 30*a* corresponding to the power conversion devices 6 based on the information of the charge amounts included in the data sets 30*a* of the priority list 30.

When the output direction of the active power is determined to be the discharge direction, the conversion device determination part 22 sorts the multiple data sets 30*a* in descending order of the charge amounts of the power storage devices 4. As a result, the priorities of the multiple power conversion devices 6 of the priority list 30 can be updated to increase priorities of the power conversion devices 6 having high charge amounts of the power storage devices 4.

Also, when the output direction of the active power is determined to be the charge direction, the conversion device determination part 22 sorts the multiple data sets 30*a* in ascending order of the charge amounts of the power storage devices 4. As a result, the priorities of the multiple power conversion devices 6 of the priority list 30 can be updated to increase priorities of the power conversion devices 6 having low charge amounts of the power storage devices 4.

For example, the conversion device determination part 22 performs the sort processing by comparing the charge amounts of two adjacent data sets 30*a* among the data sets 30*a* arranged in order of the priorities of the priority list 30.

When the output direction of the active power is the discharge direction, the conversion device determination part 22 compares the charge amounts of the two adjacent data sets 30*a* of the priority list 30 in order from the high priority side, and interchanges the order of the two data sets 30*a* as necessary to increase the priority of the power conversion device 6 having the higher charge amount.

In such a case, for example, the conversion device determination part 22 provides a dead band in the comparison of the charge amounts of the two adjacent data sets 30*a*. The conversion device determination part 22 interchanges the order of the two data sets 30*a* when the difference between the charge amounts of the two is not less than a prescribed value.

For example, the conversion device determination part 22 compares the data set 30*a* of the power conversion device 6 having the highest priority and the data set 30*a* of the second highest power conversion device 6, and interchanges the order of the two data sets 30*a* when the charge amount of the data set 30*a* corresponding to the second highest power conversion device 6 is greater than the charge amount of the data set 30*a* corresponding to the power conversion device 6 having the highest priority by not less than the prescribed value. In other words, the priority of the power conversion device 6 that was second becomes the highest; and the priority of the power conversion device 6 that was the highest becomes second.

For example, the prescribed value is set to about 2% to 3% of the maximum value of the charge amounts. As a result, undesirably frequent interchanging of the order of the data sets 30*a* of the two power conversion devices 6 can be suppressed. For example, an undesirable delay in the operations of the power conversion devices 6 due to the frequent interchange of the power conversion devices 6 to which the operation command is to be transmitted and the power conversion devices 6 to which the standby command is to be transmitted, etc., can be suppressed. However, the dead band may not always be provided.

The conversion device determination part 22 sequentially performs the processing described above in order from the high priority side. For example, after comparing the power conversion device 6 having the highest priority and the second highest power conversion device 6, the conversion device determination part 22 compares the second highest power conversion device 6 and the third highest power conversion device 6 and sequentially performs the processing. As a result, when the output direction of the active power is the discharge direction, the conversion device determination part 22 sorts the data sets 30*a* in descending order of the charge amounts. In contrast to the description described above, when the output direction of the active power is the discharge direction, the charge amounts of the data sets 30*a* corresponding to the two adjacent power conversion devices 6 of the priority list 30 may be compared in order from the low priority side.

When the output direction of the active power is the charge direction, the conversion device determination part 22 compares the charge amounts of the data sets 30*a* corresponding to the two adjacent power conversion devices 6 of the priority list 30 in order from the high priority side, and interchanges the order of the two data sets 30*a* as necessary to increase the priority of the power conversion device 6 having the lower charge amount. As a result, when the output direction of the active power is the charge direction, the conversion device determination part 22 sorts the data sets 30*a* in ascending order of the charge amounts. In contrast to the description described above, when the output direction of the active power is the charge direction, the charge amounts of the data sets 30*a* corresponding to the two adjacent power conversion devices 6 of the priority list 30 may be compared in order from the low priority side.

For example, the conversion device determination part 22 performs the comparison processing of the charge amounts described above $(N\times(N-1))/2$ iterations, wherein N is the number of the multiple power conversion devices 6.

When comparing the charge amounts of the two adjacent data sets 30*a*, the comparison iterations necessary to compare the charge amounts of all of the data sets 30*a* of the priority list 30 once each is $N-1$ iterations. For example, when the number of the multiple power conversion devices 6 is five, the comparison iterations necessary to compare the charge amounts of all of the data sets 30*a* of the priority list 30 once each is a total of four iterations, i.e., the first and second priorities, the second and third priorities, the third and fourth priorities, and the fourth and fifth priorities. As a result, the comparison can be performed once each from the charge amount of the power conversion device 6 having the highest priority to the charge amount of the power conversion device 6 having the lowest priority.

Thus, the power conversion device 6 having the highest priority or the power conversion device 6 having the lowest priority can be finalized by performing the comparison $N-1$ iterations. For example, when comparing the charge amounts of the data sets 30*a* in order from the high priority side and interchanging the order of the two data sets 30*a* as necessary to increase the priority of the power conversion device 6 having the higher charge amount, the power conversion device 6 having the lowest priority can be finalized by performing the comparison $N-1$ iterations. Conversely, when comparing the charge amounts in order from the low priority side and interchanging the order of the two data sets 30*a* as necessary to increase the priority of the power conversion device 6 having the higher charge amount, the power conversion device 6 having the highest priority can be finalized by performing the comparison $N-1$ iterations.

When continuing the comparison, the conversion device determination part 22 repeats similar processing for the remaining power conversion devices 6 other than the finalized power conversion devices 6.

For example, when the number of the multiple power conversion devices 6 is five, the fifth power conversion device 6 is finalized by comparing the first and second priorities, the second and third priorities, the third and fourth priorities, and the fourth and fifth priorities, after which the fourth power conversion device 6 is finalized by comparing the first and second priorities, the second and third priorities, and the third and fourth priorities; the third power conversion device 6 is finalized by comparing the first and second priorities and the second and third priorities; and the first and second power conversion devices 6 are finalized by comparing the first and second priorities. As a result, the power conversion devices 6 can be sorted in an order corresponding to the charge amounts from the first to the fifth. In such a case, the comparison iterations are ten (4+3+2+1) iterations, which match $(5\times(5-1))/2=10$.

By sorting as described above, the data sets 30*a* of the N power conversion devices 6 can be appropriately sorted in an order corresponding to the charge amounts by the number of iterations determined from the formula above. As a result, for example, the iterations of the comparison calculation can be less than when $(N-1)$ calculations are repeated N times, etc. The data sets 30*a* of the N power conversion devices 6 can be appropriately sorted in an order corresponding to the charge amounts by relatively few calculation iterations.

By regularly performing the comparison processing of the charge amounts $(N\times(N-1))/2$ iterations, the conversion device determination part 22 sorts the data sets 30*a* in descending order of the charge amounts when the output direction of the active power is the discharge direction, and sorts the data sets 30*a* in ascending order of the charge amounts when the output direction of the active power is the charge direction.

For example, when updating the priorities for each control period of the control device 10, the conversion device determination part 22 performs the sort processing of the data sets 30*a* as described above, subsequently determines the power conversion devices 6 to which the operation command is to be transmitted, and inputs the information of the determined power conversion devices 6 to the command transmitting part 24.

However, the cycle of the update of the priorities may be set to be longer than the control period. For example, the update of the priorities may be performed at a frequency of once every two control periods, a frequency of once every three control periods, etc.

In the example above, the conversion device determination part 22 sorts all of the data sets 30*a* in descending order of the charge amounts of the power storage devices 4 or in ascending order of the charge amounts of the power storage devices 4 for each period of the updating of the priorities.

However, the sort processing of the charge amounts after the update is not limited to that described above.

For example, the conversion device determination part 22 may compare the charge amounts of the two adjacent data sets 30*a* of the priority list 30 in order from the high priority side or the low priority side for each period of the updating of the priorities and perform interchange processing of the order of the two data sets 30*a* as necessary once each for all of the multiple data sets 30*a* of the priority list 30.

In other words, the conversion device determination part 22 may finalize the power conversion device 6 having the highest priority or the power conversion device 6 having the lowest priority by performing the N−1 iterations of the comparison of the example above for each period of the updating of the priorities. In such a case as well, the conversion device determination part 22 may provide a dead band in the comparison of the charge amounts corresponding to the two adjacent power conversion devices 6.

When all of the data sets 30*a* are sorted for each period of the updating of the priorities as in the example above, there is a possibility that the power conversion devices 6 to which the operation command is to be transmitted and the power conversion devices 6 to which the standby command is to be transmitted may be largely interchanged when the output direction of the active power is changed.

For example, when the number of the multiple power conversion devices 6 is ten, and when the output direction of the active power is changed in a state in which the operation command is transmitted to five power conversion devices 6 among the ten power conversion devices 6 and the standby command is transmitted to the remaining five power conversion devices 6, there is a possibility that the power conversion devices 6 in the operating state and the power conversion devices 6 in the standby state may be interchanged at one time. In such a case, there is a possibility that the operations of the multiple power conversion devices 6 may be delayed, etc.

In contrast, when N−1 iterations of the comparison are performed for each period of the updating of the priorities, even when the output direction of the active power is changed, a large interchange of the power conversion devices 6 to which the operation command is to be transmitted and the power conversion devices 6 to which the standby command is to be transmitted can be suppressed.

For example, when the number of the multiple power conversion devices 6 is ten, and when the output direction of the active power is changed in a state in which the operation command is transmitted to five power conversion devices 6 among the ten power conversion devices 6 and the standby command is transmitted to the remaining five power conversion devices 6, the power conversion devices 6 to which the operation command is to be transmitted and the power conversion devices 6 to which the standby command is to be transmitted can be interchanged one at a time in descending order of the charge amounts or in ascending order of the charge amounts for each period of the updating of the priorities. A delay of the operations of the multiple power conversion devices 6, etc., can be suppressed thereby.

For example, the conversion device determination part 22 may perform 2×(N−1) iterations of the comparison for each period of the updating of the priorities. In such a case, when the output direction of the active power is changed, the power conversion devices 6 to which the operation command is to be transmitted and the power conversion devices 6 to which the standby command is to be transmitted can be interchanged two at a time in descending order of the charge amounts or in ascending order of the charge amounts for each period of the updating of the priorities. It is sufficient to set the comparison iterations by the conversion device determination part 22 to any number of iterations between N−1 iterations and (N×(N−1))/2 iterations.

The priorities of the multiple power conversion devices 6 may not always be determined according to the charge amounts of the multiple power storage devices 4. For example, there are cases where the capacities of the multiple power storage devices 4 and the capacities of the multiple power conversion devices 6 are different in the power storage system 2. In such a case, the priorities of the multiple power conversion devices 6 may be determined according to the capacities of the multiple power storage devices 4 or the capacities of the multiple power conversion devices 6. For example, the priorities of the multiple power conversion devices 6 may be determined in descending order of the capacities of the multiple power storage devices 4 or the capacities of the multiple power conversion devices 6.

In the power storage system 2 according to the embodiment as described above, the conversion device determination part 22 of the control device 10 determines the number of the power conversion devices 6 to which the operation command is to be transmitted based on the total value of the active power and the total value of the reactive power determined by the output value determination part 20 and the information related to the states in the multiple data sets 30*a*, and determines the determined number of power conversion devices 6 among the multiple power conversion devices 6 in descending order of the priorities of the priority list 30 as the power conversion devices 6 to which the operation command is to be transmitted.

As a result, in the power storage system 2 and the control device 10 according to the embodiment, the power loss accompanying the operations of the multiple power conversion devices 6 can be suppressed compared to a control method in which all of the multiple power conversion devices 6 are operated regardless of the magnitude of the power necessary for the power system PS (the load).

For example, it also may be considered to determine the number of the power conversion devices 6 to which the operation command is to be transmitted based on the information of the rated capacity of the active power per device of the multiple power conversion devices 6 and the information of the rated capacity of the reactive power per device of the multiple power conversion devices 6. However, in such a case, there is a possibility that the necessary magnitude of power cannot be supplied to the load or the power storage devices 4 when there is a difference between the rated capacity and the magnitude of the power actually outputtable by the power conversion devices 6.

In the power storage system 2 and the control device 10 according to the embodiment as described above, the conversion device determination part 22 determines the number of the power conversion devices 6 to which the operation command is to be transmitted based on the total value of the active power and the total value of the reactive power determined by the output value determination part 20 and the information related to the states in the multiple data sets 30*a*. As a result, the number of the power conversion devices 6 to which the operation command is to be transmitted can be more appropriately determined by considering the states of the multiple power storage devices 4 and the multiple power conversion devices 6. Accordingly, in the power storage system 2 and the control device 10 according to the embodiment, the necessary magnitude of power can be more appropriately supplied to the load or the power storage devices 4 compared with when the rated capacities of the power conversion devices 6 are used. For example, the frequency fluctuation of the power system PS can be more appropriately suppressed while suppressing the power loss accompanying the operations of the multiple power conversion devices 6.

Also, in the power storage system 2 and the control device 10 according to the embodiment, when determining the determined number of power conversion devices 6 among the multiple power conversion devices 6 in descending order of the priorities of the priority list 30 as the power conversion devices 6 to which the operation command is to be transmitted, the conversion device determination part 22 excludes the power conversion devices 6 in the stopped state from the power conversion devices 6 to which the operation command is to be transmitted based on the information of the operating statuses included in the information related to the states. As a result, the number of the power conversion devices 6 to which the operation command is to be transmitted can be more appropriately determined, and the necessary magnitude of power can be more appropriately supplied to the load or the power storage devices 4.

Also, in the power storage system 2 and the control device 10 according to the embodiment, the conversion device determination part 22 determines the number at which the value of the added dischargeable amounts reaches or exceeds the total value of the active power as the number of the power conversion devices 6 necessary for active power in the case of the discharge direction, determines the number at which the value of the added chargeable amounts reaches or exceeds the total value of the active power as the number of the power conversion devices 6 necessary for active power in the case of the charge direction, determines the number at which the value of the added capacitive reactive power outputtable amounts reaches or exceeds the total value of the reactive power as the number of the power conversion devices 6 necessary for reactive power in the case of capacitive reactive power, determines the number at which the value of the added inductive reactive power outputtable amounts reaches or exceeds the total value of the reactive power as the number of the power conversion devices 6 necessary for reactive power in the case of inductive reactive power, compares the number of the power conversion devices 6 necessary for active power and the number of the power conversion devices 6 necessary for reactive power, and determines the greater number as the number of the power conversion devices 6 to which the operation command is to be transmitted. As a result, the number of the power conversion devices 6 to which the operation command is to be transmitted can be more appropriately determined, and the necessary magnitude of power can be more appropriately supplied to the load or the power storage devices 4.

Furthermore, in the power storage system 2 and the control device 10 according to the embodiment, the conversion device determination part 22 excludes the power conversion devices 6 in the stopped state from the calculation of adding the dischargeable amounts, the calculation of adding the chargeable amounts, the calculation of adding the capacitive reactive power, and the calculation of adding the inductive reactive power based on the information of the operating statuses included in the information related to the states. As a result, the number of the power conversion devices 6 to which the operation command is to be transmitted can be more appropriately determined, and the necessary magnitude of power can be more appropriately supplied to the load or the power storage devices 4.

According to the embodiments above, the conversion device determination part 22 acquires the information related to the states of the multiple power storage devices 4 and the multiple power conversion devices 6 by communicating with the multiple power storage devices 4 and the multiple power conversion devices 6. The information related to the states of the multiple power storage devices 4 and the multiple power conversion devices 6 is not limited to being obtained as described above, and may be acquired from, for example, a higher-level controller, etc. The method for acquiring the information related to the states may be any method in which the conversion device determination part 22 can appropriately acquire the information related to the states.

Also, an example is shown in the embodiments above in which the power system PS is used as a load, and the power storage system 2 is applied to the power system PS. The application of the power storage system 2 is not limited to the power system PS; for example, the power storage system 2 is applicable to an electric vehicle such as an electric locomotive, an electric car, etc. For example, the motor of the electric vehicle is used as the load; the multiple power conversion devices 6 are connected to the motor; and the power storage system 2 described above is applicable when supplying the power to the motor and using the regenerative energy of the motor to charge the multiple power storage devices 4. The load to which the power storage system 2 is applied is not limited to the power system PS or an electric vehicle, and may be any load for which the supply of the power to the load and the charging of the multiple power storage devices 4 by the power of the load side can be performed.

Embodiments may include the following configurations.

Appendix 1

A power storage system, comprising:

a plurality of power storage devices capable of discharging and charging direct current power;

a plurality of power conversion devices connected to the plurality of power storage devices and a load, the plurality of power conversion devices converting direct current power stored in the plurality of power storage devices into power corresponding to the load, the plurality of power conversion devices supplying the power to the load based on the direct current power stored in the plurality of power storage devices, the plurality of power conversion devices converting power of the load into direct current power corresponding to the plurality of power storage devices, the plurality of power conversion devices charging the plurality of power storage devices based on the power of the load side; and a control device controlling a power conversion operation of the plurality of power conversion devices, the control device including an output value determination part determining a total value of active power and a total value of reactive power output from the plurality of power conversion devices, a conversion device determination part determining the power conversion devices among the plurality of power conversion devices to which an operation command is to be transmitted, and a command transmitting part transmitting the operation command to the power conversion devices determined by the conversion device determination part and transmitting a standby command to remaining power conversion devices among the plurality of power conversion devices to which the operation command is not to be transmitted, the conversion device determination part including a priority list representing priorities of the plurality of power conversion devices, the priority list including a plurality of data sets corresponding respectively to the plurality of power conversion devices, the plurality of data sets associating and storing the priorities of the plurality of power conversion devices, identification information for identifying the plurality of power conversion devices, and information related to states of the plurality of power storage devices and the plurality of power conversion devices, the conversion device determination part determining, based on the total value of the active power and the total value of the reactive power determined by the output value determination part and based on the information related to the states of the plurality of data sets, a number of the power conversion devices to which the operation command is to be transmitted, the conversion device determination part determining, as the power conversion devices to which the operation command is to be transmitted, the determined number of the power conversion devices among the plurality of power conversion devices in descending order of the priorities of the priority list.

Appendix 2

The power storage system according to Appendix 1, wherein the information related to the states includes information of operating statuses of the plurality of power conversion devices, the information of the operating statuses indicates which states among an operating state, a standby state, and a stopped state that the plurality of power conversion devices respectively is in, and when the conversion device determination part determines, as the power conversion devices to which the operation command is to be transmitted, the determined number of the power conversion devices among the plurality of power conversion devices in descending order of the priorities of the priority list, the conversion device determination part excludes, based on the information of the operating statuses included in the information related to the states, the power conversion devices in the stopped state from the power conversion devices to which the operation command is to be transmitted.

Appendix 3

The power storage system according to Appendixes 1 or 2, wherein the information related to the states includes:

information of charge amounts of the power storage devices, information of dischargeable amounts of the power storage devices, information of chargeable amounts of the power storage devices, information of capacitive reactive power outputtable amounts of the power conversion devices, and information of inductive reactive power outputtable amounts of the power conversion devices, when an output direction of the active power of the plurality of power conversion devices is a discharge direction, the conversion device determination part performs a calculation of adding the dischargeable amounts in order from the power conversion devices having high priorities in the priority list, and the conversion device determination part determines, as a number of the power conversion devices necessary for active power, a number at which a value of the added dischargeable amounts reaches or exceeds the total value of the active power determined by the output value determination part, when the output direction of the active power of the plurality of power conversion devices is a charge direction, the conversion device determination part performs a calculation of adding the chargeable amounts in order from the power conversion devices having high priorities in the priority list, and the conversion device determination part determines, as the number of the power conversion devices necessary for active power, a number at which a value of the added chargeable amounts reaches or exceeds the total value of the active power determined by the output value determination part, when the reactive power output from the plurality of power conversion devices is capacitive reactive power, the conversion device determination part performs a calculation of adding the capacitive reactive power outputtable amounts in order from the power conversion devices having high priorities in the priority list, and the conversion device determination part determines, as a number of the power conversion devices necessary for reactive power, a number at which a value of the added capacitive reactive power outputtable amounts reaches or exceeds the total value of the reactive power determined by the output value determination part, when the reactive power output from the plurality of power conversion devices is inductive reactive power, the conversion device determination part performs a calculation of adding the inductive reactive power outputtable amounts in order from the power conversion devices having high priorities in the priority list, and the conversion device determination part determines, as the number of the power conversion devices necessary for reactive power, a number at which a value of the added inductive reactive power outputtable amounts reaches or exceeds the total value of the reactive power determined by the output value determination part, the conversion device determination part compares the number of the power conversion devices necessary for active power and the number of the power conversion devices necessary for reactive power, and the conversion device determination part determines, as the number of the power conversion devices to which the operation command is to be transmitted, a greater number of the compared numbers.

Appendix 4

The power storage system according to Appendix 3, wherein the information related to the states includes information of operating statuses of the plurality of power conversion devices, the information of the operating statuses indicates which states among an operating state, a standby state, and a stopped state that the plurality of power conversion devices respectively is in, and based on the information of the operating statuses included in the information related to the states, the conversion device determination part excludes the power conversion devices in the stopped state from a calculation of adding the dischargeable amounts, a calculation of adding the chargeable amounts, a calculation of adding the capacitive reactive power, and a calculation of adding the inductive reactive power.

Appendix 5

The power storage system according to any one of Appendixes 1 to 4, wherein the information related to the states includes information of charge amounts of the power storage devices, the conversion device determination part determines the priorities of the plurality of power conversion devices of the priority list according to the charge amounts of the plurality of power storage devices, when an output direction of the active power of the plurality of power conversion devices is a discharge direction of supplying the power to the load, the conversion device determination part increases the priorities of the power conversion devices having high charge amounts of the power storage devices, and when the output direction of the active power of the plurality of power conversion devices is a charge direction of charging the power storage devices based on the power of the load, the conversion device determination part increases the priorities of the power conversion devices having low charge amounts of the power storage devices.

Appendix 6

The power storage system according to Appendix 5, wherein the conversion device determination part regularly updates the priorities of the plurality of power conversion devices of the priority list by:

regularly acquiring the information related to the states;

updating the information related to the states of the plurality of data sets based on the acquired information related to the states; and performing sort processing of the charge amounts of the power storage devices included in the information related to the states after the updating.

Appendix 7

The power storage system according to Appendix 6, wherein when the output direction of the active power of the plurality of power conversion devices is the discharge direction of supplying the power to the load, the conversion device determination part sorts the plurality of data sets in descending order of the charge amounts of the power storage devices, and when the output direction of the active power of the plurality of power conversion devices is the charge direction of charging the power storage devices based on the power of the load, the conversion device determination part sorts the plurality of data sets in ascending order of the charge amounts of the power storage devices.

Appendix 8

The power storage system according to Appendix 7, wherein when the output direction of the active power is the discharge direction, the conversion device determination part:

compares charge amounts of two adjacent data sets among the data sets of the priority list in order from a high priority side or a low priority side;

performs interchange processing of an order of the two data sets as necessary to increase the priority of the power conversion device having a higher charge amount;

finalizes the power conversion device having a highest priority or the power conversion device having a lowest priority by performing the interchange processing once each from the charge amount of the power conversion device having the highest priority to the charge amount of the power conversion device having the lowest priority; and sorts the plurality of data sets after updating in descending order of the charge amounts by repeating similar processing for remaining power conversion devices other than the finalized power conversion device to cause an iteration of the comparison to be $(N\times(N-1))/2$ iterations, where N is a number of the plurality of power conversion devices, and when the output direction of the active power is the charge direction, the conversion device determination part:

compares charge amounts of two adjacent data sets among the data sets of the priority list in order from the high priority side or the low priority side;

performs interchange processing of an order of the two data sets as necessary to increase the priority of the power conversion device having a lower charge amount;

finalizes the power conversion device having a highest priority or the power conversion device having a lowest priority by performing the interchange processing once each from the charge amount of the power conversion device having the highest priority to the charge amount of the power conversion device having the lowest priority; and sorts the plurality of data sets after updating in ascending order of the charge amounts by repeating similar processing for remaining power conversion devices other than the finalized power conversion device to cause an iteration of the comparison to be $(N\times(N-1))/2$ iterations.

Appendix 9

The power storage system according to Appendix 8, wherein when comparing the charge amounts of the two adjacent data sets, the conversion device determination part interchanges the order of the two data sets when a difference between the charge amounts of the two is not less than a prescribed value.

Appendix 10

The power storage system according to Appendix 7, wherein for each period of updating the information related to the states, the conversion device determination part:

compares charge amounts of two adjacent data sets among the data sets of the priority list in order from a high priority side or a low priority side; and performs interchange processing of an order of the two data sets as necessary once each for all of the plurality of data sets of the priority list.

Appendix 11

A control device, the control device controlling a power conversion operation of a plurality of power conversion devices, the plurality of power conversion devices being connected to a plurality of power storage devices and a load, the plurality of power conversion devices converting direct current power stored in the plurality of power storage devices into power corresponding to the load, the plurality of power conversion devices supplying the power to the load based on the direct current power stored in the plurality of power storage devices, the plurality of power conversion devices converting power of the load into direct current power corresponding to the plurality of power storage devices, the plurality of power conversion devices charging the plurality of power storage devices based on the power of the load side, the control device comprising:

an output value determination part determining a total value of active power and a total value of reactive power output from the plurality of power conversion devices;

a conversion device determination part determining the power conversion devices among the plurality of power conversion devices to which an operation command is to be transmitted; and a command transmitting part transmitting the operation command to the power conversion devices determined by the conversion device determination part and transmitting a standby command to remaining power conversion devices among the plurality of power conversion devices to which the operation command is not to be transmitted, the conversion device determination part including a priority list representing priorities of the plurality of power conversion devices, the priority list including a plurality of data sets corresponding respectively to the plurality of power conversion devices, the plurality of data sets associating and storing the priorities of the plurality of power conversion devices, identification information for identifying the plurality of power conversion devices, and information related to states of the plurality of power storage devices and the plurality of power conversion devices, the conversion device determination part determining, based on the total value of the active power and the total value of the reactive power determined by the output value determination part and based on the information related to the states of the plurality of data sets, a number of the power conversion devices to which the operation command is to be transmitted, the conversion device determination part determining, as the power conversion devices to which the operation command is to be transmitted, the determined number of the power conversion devices among the plurality of power conversion devices in descending order of the priorities in the priority list.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

The invention claimed is:

1. A power storage system, comprising:

a plurality of power storage devices capable of discharging and charging direct current power;

a plurality of power conversion devices connected to the plurality of power storage devices and a load, the plurality of power conversion devices converting direct current power stored in the plurality of power storage devices into power corresponding to the load, the plurality of power conversion devices supplying the power to the load based on the direct current power stored in the plurality of power storage devices, the plurality of power conversion devices converting power of the load into direct current power corresponding to the plurality of power storage devices, the plurality of power conversion devices charging the plurality of power storage devices based on the power of the load side; and a control device controlling a power conversion operation of the plurality of power conversion devices, the control device including an output value determination part determining a total value of active power and a total value of reactive power output from the plurality of power conversion devices, a conversion device determination part determining the power conversion devices among the plurality of power conversion devices to which an operation command is to be transmitted, and a command transmitting part transmitting the operation command to the power conversion devices determined by the conversion device determination part and transmitting a standby command to remaining power conversion devices among the plurality of power conversion devices to which the operation command is not to be transmitted, the conversion device determination part including a priority list representing priorities of the plurality of power conversion devices, the priority list including a plurality of data sets corresponding respectively to the plurality of power conversion devices, the plurality of data sets associating and storing the priorities of the plurality of power conversion devices, identification information for identifying the plurality of power conversion devices, and information related to states of the plurality of power storage devices and the plurality of power conversion devices, the conversion device determination part determining, based on the total value of the active power and the total value of the reactive power determined by the output value determination part and based on the information related to the states of the plurality of data sets, a number of the power conversion devices to which the operation command is to be transmitted, the conversion device determination part determining, as the power conversion devices to which the operation command is to be transmitted, the determined number of the power conversion devices among the plurality of power conversion devices in descending order of the priorities of the priority list.

2. The power storage system according to claim 1, wherein the information related to the states includes information of operating statuses of the plurality of power conversion devices, the information of the operating statuses indicates which states among an operating state, a standby state, and a stopped state that the plurality of power conversion devices respectively is in, and when the conversion device determination part determines, as the power conversion devices to which the operation command is to be transmitted, the determined number of the power conversion devices among the plurality of power conversion devices in descending order of the priorities of the priority list, the conversion device determination part excludes, based on the information of the operating statuses included in the information related to the states, the power conversion devices in the stopped state from the power conversion devices to which the operation command is to be transmitted.

3. The power storage system according to claim 1, wherein the information related to the states includes:

information of charge amounts of the power storage devices, information of dischargeable amounts of the power storage devices, information of chargeable amounts of the power storage devices, information of capacitive reactive power outputable amounts of the power conversion devices, and information of inductive reactive power outputable amounts of the power conversion devices, when an output direction of the active power of the plurality of power conversion devices is a discharge direction, the conversion device determination part performs a calculation of adding the dischargeable amounts in order from the power conversion devices having high priorities in the priority list, and the conversion device determination part determines, as a number of the power conversion devices necessary for active power, a number at which a value of the added dischargeable amounts reaches or exceeds the total value of the active power determined by the output value determination part, when the output direction of the active power of the plurality of power conversion devices is a charge direction, the conversion device determination part performs a calculation of adding the chargeable amounts in order from the power conversion devices having high priorities in the priority list, and the conversion device determination part determines, as the number of the power conversion devices necessary for active power, a number at which a value of the added chargeable amounts reaches or exceeds the total value of the active power determined by the output value determination part, when the reactive power output from the plurality of power conversion devices is capacitive reactive power, the conversion device determination part performs a calculation of adding the capacitive reactive power outputable amounts in order from the power conversion devices having high priorities in the priority list, and the conversion device determination part determines, as a number of the power conversion devices necessary for reactive power, a number at which a value of the added capacitive reactive power outputable amounts reaches or exceeds the total value of the reactive power determined by the output value determination part, when the reactive power output from the plurality of power conversion devices is inductive reactive power, the conversion device determination part performs a calculation of adding the inductive reactive power outputable amounts in order from the power conversion devices having high priorities in the priority list, and the conversion device determination part determines, as the number of the power conversion devices necessary for reactive power, a number at which a value of the added inductive reactive power outputable amounts reaches or exceeds the total value of the reactive power determined by the output value determination part, the conversion device determination part compares the number of the power conversion devices necessary for active power and the number of the power conversion devices necessary for reactive power, and the conversion device determination part determines, as the number of the power conversion devices to which the operation command is to be transmitted, a greater number of the compared numbers.

4. The power storage system according to claim 3, wherein the information related to the states includes information of operating statuses of the plurality of power conversion devices, the information of the operating statuses indicates which states among an operating state, a standby state, and a stopped state that the plurality of power conversion devices respectively is in, and based on the information of the operating statuses included in the information related to the states, the conversion device determination part excludes the power conversion devices in the stopped state from a calculation of adding the dischargeable amounts, a calculation of adding the chargeable amounts, a calculation of adding the capacitive reactive power, and a calculation of adding the inductive reactive power.

5. The power storage system according to claim 1, wherein the information related to the states includes information of charge amounts of the power storage devices, the conversion device determination part determines the priorities of the plurality of power conversion devices of the priority list according to the charge amounts of the plurality of power storage devices, when an output direction of the active power of the plurality of power conversion devices is a discharge direction of supplying the power to the load, the conversion device determination part increases the priorities of the power conversion devices having high charge amounts of the power storage devices, and when the output direction of the active power of the plurality of power conversion devices is a charge direction of charging the power storage devices based on the power of the load, the conversion device determination part increases the priorities of the power conversion devices having low charge amounts of the power storage devices.

6. The power storage system according to claim 5, wherein the conversion device determination part regularly updates the priorities of the plurality of power conversion devices of the priority list by:

regularly acquiring the information related to the states;

updating the information related to the states of the plurality of data sets based on the acquired information related to the states; and performing sort processing of the charge amounts of the power storage devices included in the information related to the states after the updating.

7. The power storage system according to claim 6, wherein when the output direction of the active power of the plurality of power conversion devices is the discharge direction of supplying the power to the load, the conversion device determination part sorts the plurality of data sets in descending order of the charge amounts of the power storage devices, and when the output direction of the active power of the plurality of power conversion devices is the charge direction of charging the power storage devices based on the power of the load, the conversion device determination part sorts the plurality of data sets in ascending order of the charge amounts of the power storage devices.

8. The power storage system according to claim 7, wherein when the output direction of the active power is the discharge direction, the conversion device determination part:

compares charge amounts of two adjacent data sets among the data sets of the priority list in order from a high priority side or a low priority side;

performs interchange processing of an order of the two data sets as necessary to increase the priority of the power conversion device having a higher charge amount;

finalizes the power conversion device having a highest priority or the power conversion device having a lowest priority by performing the interchange processing once each from the charge amount of the power conversion device having the highest priority to the charge amount of the power conversion device having the lowest priority; and sorts the plurality of data sets after updating in descending order of the charge amounts by repeating similar processing for remaining power conversion devices other than the finalized power conversion device to cause an iteration of the comparison to be (N×(N−1))/2 iterations, where N is a number of the plurality of power conversion devices, and when the output direction of the active power is the charge direction, the conversion device determination part:

compares charge amounts of two adjacent data sets among the data sets of the priority list in order from the high priority side or the low priority side;

performs interchange processing of an order of the two data sets as necessary to increase the priority of the power conversion device having a lower charge amount;

finalizes the power conversion device having a highest priority or the power conversion device having a lowest priority by performing the interchange processing once each from the charge amount of the power conversion device having the highest priority to the charge amount of the power conversion device having the lowest priority; and sorts the plurality of data sets after updating in ascending order of the charge amounts by repeating similar processing for remaining power conversion devices other than the finalized power conversion device to cause an iteration of the comparison to be (N×(N−1))/2 iterations.

9. The power storage system according to claim 8, wherein when comparing the charge amounts of the two adjacent data sets, the conversion device determination part interchanges the order of the two data sets when a difference between the charge amounts of the two is not less than a prescribed value.

10. The power storage system according to claim 7, wherein for each period of updating the information related to the states, the conversion device determination part:

compares charge amounts of two adjacent data sets among the data sets of the priority list in order from a high priority side or a low priority side; and performs interchange processing of an order of the two data sets as necessary once each for all of the plurality of data sets of the priority list.

11. A control device, the control device controlling a power conversion operation of a plurality of power conversion devices, the plurality of power conversion devices being connected to a plurality of power storage devices and a load, the plurality of power conversion devices converting direct current power stored in the plurality of power storage devices into power corresponding to the load, the plurality of power conversion devices supplying the power to the load based on the direct current power stored in the plurality of power storage devices, the plurality of power conversion devices converting power of the load into direct current power corresponding to the plurality of power storage devices, the plurality of power conversion devices charging the plurality of power storage devices based on the power of the load side, the control device comprising:

an output value determination part determining a total value of active power and a total value of reactive power output from the plurality of power conversion devices;

a conversion device determination part determining the power conversion devices among the plurality of power conversion devices to which an operation command is to be transmitted; and a command transmitting part transmitting the operation command to the power conversion devices determined by the conversion device determination part and transmitting a standby command to remaining power conversion devices among the plurality of power conversion devices to which the operation command is not to be transmitted, the conversion device determination part including a priority list representing priorities of the plurality of power conversion devices, the priority list including a plurality of data sets corresponding respectively to the plurality of power conversion devices, the plurality of data sets associating and storing the priorities of the plurality of power conversion devices, identification information for identifying the plurality of power conversion devices, and information related to states of the plurality of power storage devices and the plurality of power conversion devices, the conversion device determination part determining, based on the total value of the active power and the total value of the reactive power determined by the output value determination part and based on the information related to the states of the plurality of data sets, a number of the power conversion devices to which the operation command is to be transmitted, the conversion device determination part determining, as the power conversion devices to which the operation command is to be transmitted, the determined number of the power conversion devices among the plurality of power conversion devices in descending order of the priorities in the priority list.

* * * * *